United States Patent [19]
Balcome

[11] 3,792,567
[45] Feb. 19, 1974

[54] HEAT SEALING MACHINE
[75] Inventor: Herbert L. Balcome, Norcross, Ga.
[73] Assignee: Dixie Packaging Company, Inc.
[22] Filed: Dec. 7, 1971
[21] Appl. No.: 205,635

[52] U.S. Cl............................ 53/329, 53/282, 53/373
[51] Int. Cl.............................................. B65b 7/16
[58] Field of Search ............. 53/329, 282, 184, 373; 198/131

[56] References Cited
UNITED STATES PATENTS

| | | | |
|---|---|---|---|
| 3,478,489 | 11/1969 | Meisner | 53/282 X |
| 3,587,829 | 6/1971 | Sorensen | 198/131 |
| 3,378,991 | 4/1968 | Anderson | 53/373 |
| 3,555,768 | 11/1971 | Miller | 53/329 X |
| 3,342,010 | 9/1967 | Henry | 53/282 X |

*Primary Examiner*—Travis S. McGehee

[57] ABSTRACT

A heat sealing machine for use in sealing a thermoplastic cover to the upper surface of container means supported at a heat sealing position. The heat sealing machine includes endless conveyor means having a plurality of support elements designed for removably supported selected ones of a number of container support platens, wherein the container support platens are designed for supporting a number of various sized containers to be sealed. The conveyor means includes means for effecting intermittent drive to advance the support element with the platen and containers through predetermined increments of movement for positioning the containers in position adjacent a heat sealing station. The heat sealing station includes means for applying a thermoplastic film of material to the upper surface of the containers and includes a heat sealing element cyclically movable from a retracted inoperable position displaced from the container to an extended operable position in pressing engagement with the thermoplastic material and the container and wherein the heat sealing element is operable in the extended position for heating the thermoplastic material to a predetermined temperature for sealing the material to the upper surface of the containers. Severing means is located adjacent the conveyor means and positioned to sever the thermoplastic material adjacent the leading and trailing edge of the sealed container means. The severing means includes means for severing the thermoplastic material between side by side container means supported in a platen. Control means is operatively associated with the heat sealing machine for effecting cyclic operation of the conveyor drive means, the heat sealing means and the severing means.

15 Claims, 10 Drawing Figures

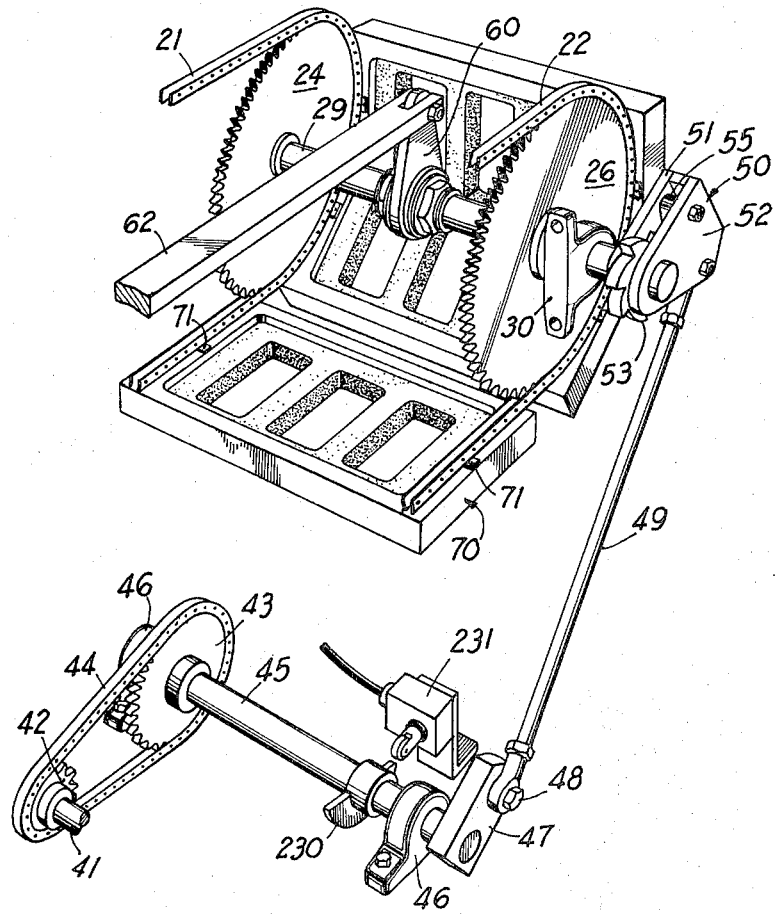
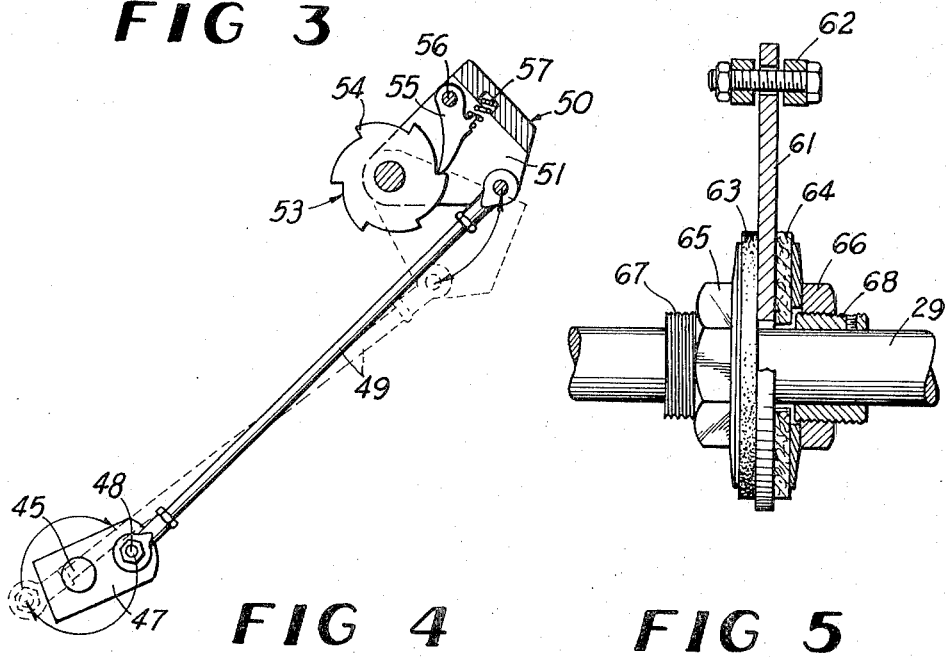
FIG 3  FIG 4  FIG 5

3,792,567

HEAT SEALING MACHINE

BACKGROUND OF THE INVENTION

This invention relates to a machine for use in sealing a plurality of containers having food products or other material contained therein by applying a thermoplastic film over the containers and heat sealing the film to edge portions of the containers.

The supplying of food to the great mass of people employed in industrial plants, on construction sites and in various other locations remote from the facilities at which the food has been processed, has necessitated the improvement in the packaging of these food products. A number of plastic container means have been provided for containing the food products for shipment and handling between the kitchen preparation facilities and the facilities at which the food is to be dispensed. In the utilizing of the plastic container means, the food is first placed in the container and then a film of thermoplastic material is applied to the surface of the containers and is heat sealed to the edge portions of the containers.

A number of attempts have been made to provide machinery for supporting a plurality of food containers having food therein and for moving these containers in position for applying the thermoplastic film of material and for heat sealing the film to the containers and for thereafter severing the thermoplastic material to separate the containers into individual container elements. However, the prior art heat sealing machines have been extremely complex in construction, expensive to manufacture and unreliable in operation.

SUMMARY OF THE INVENTION

The above disadvantages of the prior art have been overcome by the present invention which basically includes an endless conveyor having a plurality of juxtapositioned support elements designed for supporting a selected one of a plurality of container platen means. The container platen means is constructed to be removably mounted in the support elements whereby a selected platen designed for supporting a selected container can be placed within the support element. The conveyor is cyclically controlled for intermittent drive to advance the platen and supported container adjacent a heat sealing station wherein a thermoplastic material is applied and heat sealed to the upper surface of the containers.

One important feature of the present invention includes cyclic operation of the heat sealing means and the thermoplastic applying means wherein a predetermined amount of thermoplastic material is unreeled during one heat sealing operation to be applied to the upper surface of the next adjacent container during movement of the container in position adjacent the heat sealing station.

Another important feature of the present invention includes the severing means which is supported in position adjacent the conveyor means and detailed in location for simultaneously severing the thermoplastic material adjacent the leading edge and trailing edge of a sealed container means. The severing means also includes selectively settable severing elements which will sever the thermoplastic material between side by side supported containers to separate the film from the individual container elements.

A further feature of the present invention includes the control means for effecting cyclic operation of the conveyor intermittent drive means and for effecting operation of the heat sealing means, the thermoplastic unreeling means and the severing means.

It is therefore a primary object of the present invention to provide a machine which will effectively support a container in position to receive a thermoplastic film and including means for heat sealing the film to the upper surface of the container.

Another object of the present invention is to provide an intermittent drive means for effecting increments of movement of a conveyor along predetermined distances for aligning a container in position adjacent a heat sealing station.

A further object of the present invention is to provide a heat sealing station having a cyclically movable heating element with means for applying thermoplastic material to the upper surface of the container during a heat sealing operation.

A still further object of the present invention is to provide a conveyor having a support element for removably supporting selected ones of a number of container platen means.

Still another object of the present invention is to provide severing means supported in position adjacent the conveyor means for severing a film of plastic material at selected positions adjacent edge portions of container means.

An additional object of the present invention is to provide a heat sealing machine which is simple in construction and operation, economical to manufacture and reliable in performance.

These and other objects and advantages of the details of construction will become apparent upon reading the following description of the illustrative embodiment embodying the principles of the present invention with reference to the attached drawings wherein like reference numerals have been used to refer to like parts throughout the several figures, and wherein:

BRIEF DESCRIPTION OF THE DRAWINGS

FIG. 3 is an enlarged fragmentary perspective view showing the conveyor drive control means;

FIG. 4 is a fragmentary side elevational view of the drive control means shown in FIG. 3 with certain parts omitted and certain parts broken away and shown in section for purpose of clarity;

FIG. 5 is an enlarged fragmentary transverse elevational view of the conveyor brake assembly with certain parts broken away and shown in section for purpose of clarity;

DESCRIPTION OF THE ILLUSTRATIVE EMBODIMENT

Figure 1:
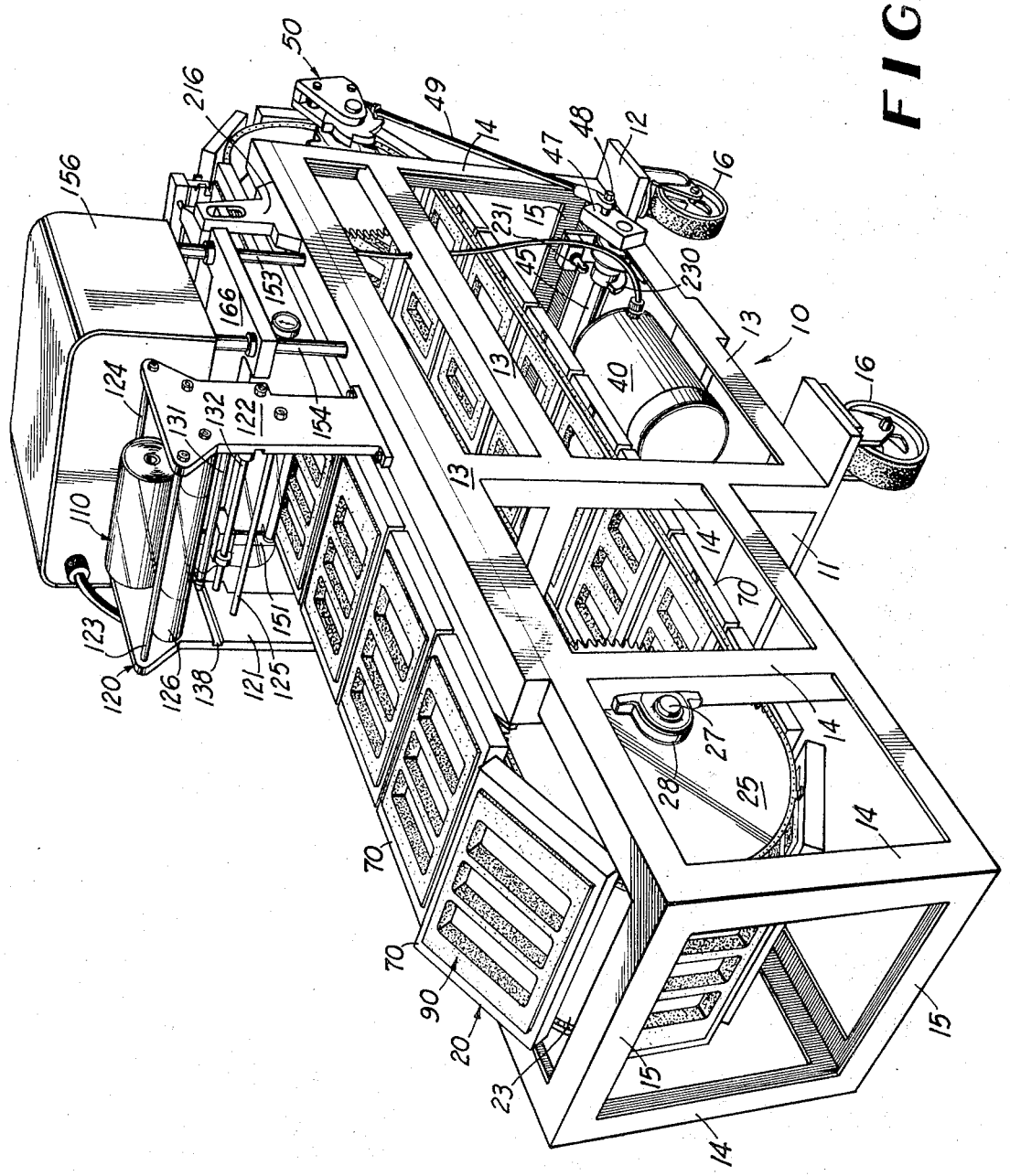
FIG. 1 is a perspective view illustrating a heat sealing machine embodying the principles of the present invention.

Referring now to the drawing, the heat sealing machine is shown and generally represented by the reference numeral 10 and will be described with reference to a frame support means 11, 12, etc; conveying means 20, 21 etc.; a removable platen container support means 90, 91, etc.; means for applying a thermoplastic film 120, 121, etc.; means for heat sealing the thermoplastic film 150, 151, etc.; and, means for severing the film of thermoplastic material 180, 181, etc.

As shown in FIG. 1, the frame support means is constructed of conventional metal stock material and includes a pair of horizontally oriented parallel arranged base support frame elements 11, 12. Extending upwardly from the base frame elements 11, 12 are a plurality of longitudinally oriented vertically spaced parallel arranged frame elements 13, a plurality of vertically oriented longitudinally spaced parallel arranged frame elements 14 and a plurality of transversely extending parallel arranged frame elements 15.

The frame elements 14-15 are constructed to form a substantially rectangular framework which will provide suitable support means for the heat sealing machine as will be described in more detail hereinbelow. The framework support means is provided with a plurality of wheel means 16 supported beneath the base frame elements 11, 12 to provide mobile support means whereby the frame can be maneuvered to various preselected locations for use.

The heat sealing machine is provided with conveyor means generally represented by the reference numeral 20, as shown in FIG. 1. The conveyor means 20 is constructed of a pair of endless chains 21, 22. Endless chain 21 is supported by a pair of coplanar aligned sprockets 23, 24. Chain 22 is supported by a pair of coplanar sprockets 25, 26. Sprockets 23, 25 are fixed to a cross support shaft 27. Shaft 27 is journaled for rotation in conventional bearing means 28 which are attached to vertical frame elements 14. The sprockets 24, 26 are fixed in axially spaced location to a cross support shaft 29 which is journaled for rotation in conventional bearing means 30. Bearing means 30 are supported on the vertical frame elements 14.

Figure 8:
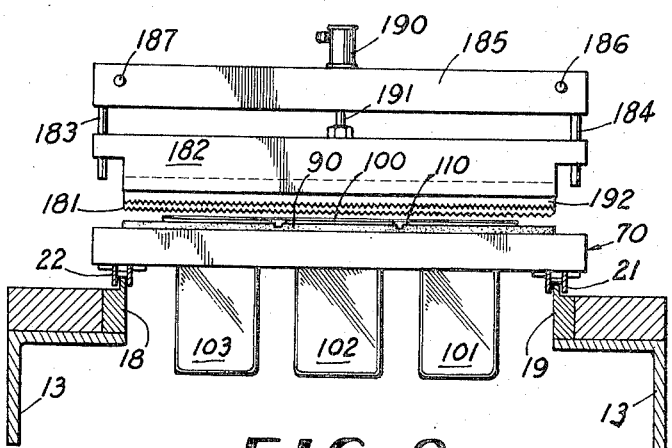
FIG. 8 is a vertical sectional view taken along line 8—8 of FIG. 7, with certain parts omitted for purpose of clarity.
Figure 9:
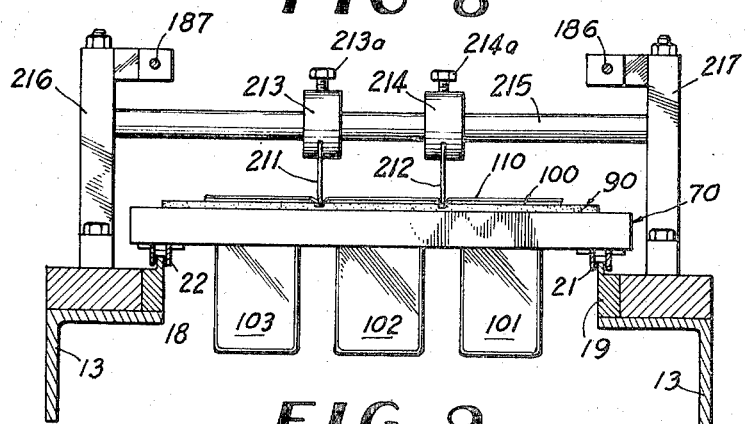
FIG. 9 is a vertical sectional view taken along line 9—9 of FIG. 7 with certain parts omitted for purpose of clarity; and, FIG. 10 is a vertical sectional view taken along line 10—10 of FIG. 7 with certain parts omitted and certain parts broken away and shown in section for purpose of clarity.

As shown in FIGS. 8 and 9, the conveyor chains 21, 22 are supported in a horizontally aligned position during movement along the upper run by a pair of guide track elements 18, 19. The guide track elements 18, 19 include shaped portions which are detailed to fit within the lateral flanges of the chain elements 21, 22 for maintaining the chains in an aligned position and for providing a firm base beneath the chain and support elements during a heat sealing operation.

Power drive for effecting movement of the conveyor 20 is provided by a motor and gear drive housing represented by the reference numeral 40, as shown in FIG. 1. The motor and gear drive housing 40 includes an output drive shaft 41 (FIG. 3) which is provided with a sprocket 42. Drive from sprocket 42 is delivered to a coplanar aligned sprocket 43, by a conventional chain 44. The sprocket 43 is fixed to control shaft 45 which is journaled for rotation within conventional bearing means 46. The bearings 46 are attached to the bottom longitudinally extending frame elements 13. The rightward extended end of shaft 45 is provided with a fixed crank member 47. Crank member 47 includes a radially spaced crank pin 48 which is connected to a drive rod 49. An extended end of drive rod 49 is connected to a ratchet means generally represented by the reference numeral 50. Ratchet means 50 includes a pair of plate elements which are parallel arranged and rotatably supported on a right extended end of shaft 29, as shown in FIG. 2.

Referring now particularly to FIGS. 3 and 4, the ratchet drive means includes a gear ratchet member 53 which is provided with a plurality of radially extending ratchet teeth 54. The ratchet gear member 53 is fixed to the cross support shaft 29 and located between the ratchet plate members 51, 52. Ratchet means 50 includes a dog 55 which is pivotally supported at 56 and includes a spring means 57 for biasing the dog into contact with the ratchet teeth 54. The ratchet drive mechanism 50 is detailed such that one cycle of rotation of the crank 47 will cause the drive rod 49 to effect angular displacement of the ratchet housing 50 a distance sufficiently to allow the dog 55 to be advanced counterclockwise over one of the ratchet teeth 54. A continued clockwise rotation of the crank pin will advance the ratchet housing 50 in a clockwise direction a sufficient distance to advance the conveyor a predetermined distance sufficient to position a platen support mechanism 70 at an aligned position beneath the heat sealing means, which will be described in more detail hereinbelow.

As shown in FIGS. 3 and 5, the conveyor drive control means is provided with a brake assembly which will prevent the conveyor and support platens from freewheeling during the intermittent drive operation described hereinabove. The brake means 60 includes a brake arm 61 which is rotatably supported about cross shaft 29. A radially extending end of brake arm 61 is connected to a fixed frame member 62 to prevent angular displacement of the brake arm. The brake arm 61 is secured in frictional pressed relationship between a pair of brake disc members 63, 64. The brake disc members 63, 64 are supported on opposite sides of the brake arm 61 and are supported in an adjustable pressure relationship with the brake arm by means of a pair of threaded connecting members 65, 66. The threaded connected members 65, 66 are threadably supported by collar elements 67, 68. The collars 67, 68 are fixed to the cross support shaft 29 by conventional set screw means.

Figure 2:
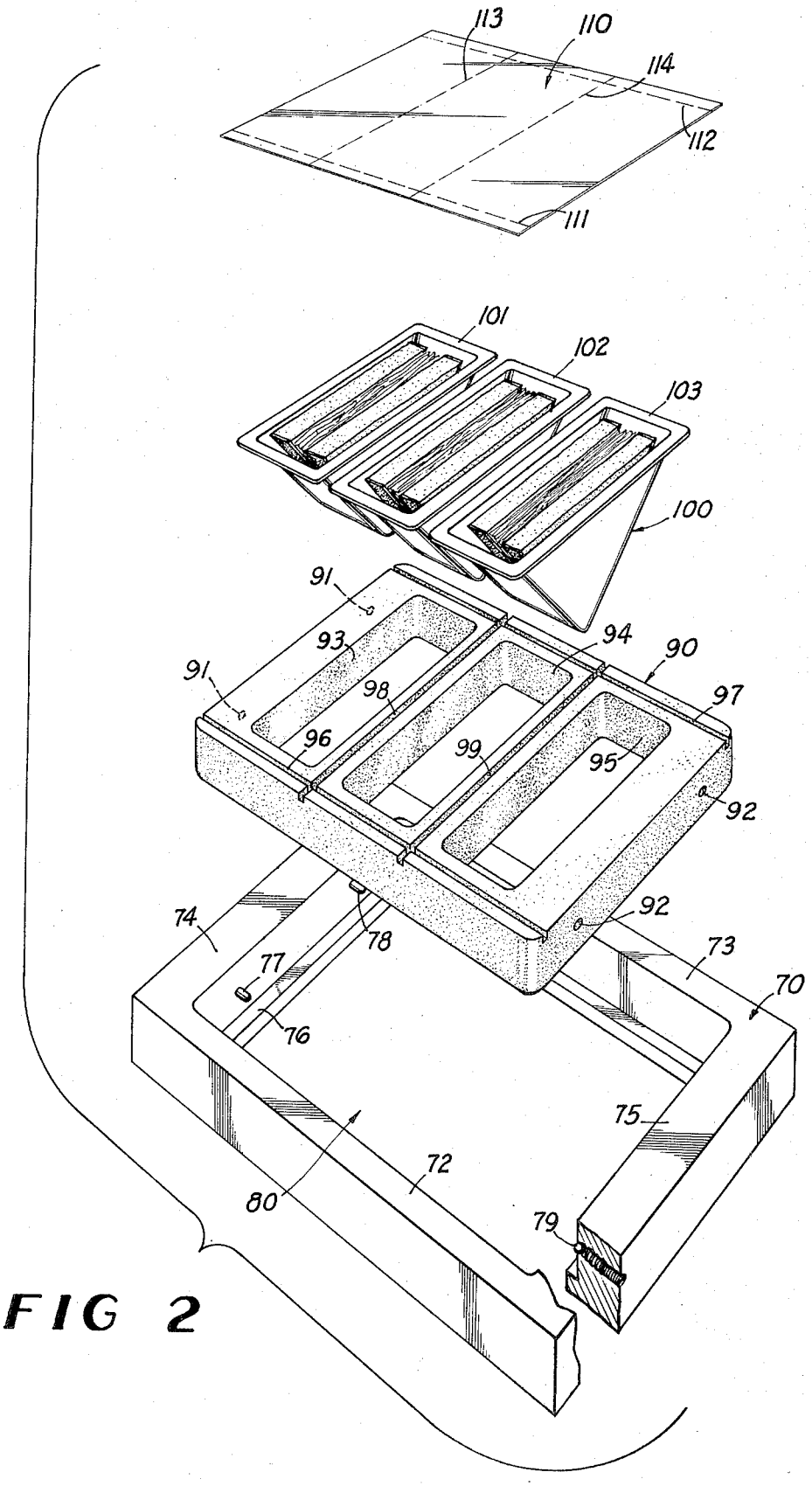
FIG. 2 is an enlarged exploded perspective view showing a conveyor support element with a selected container support platen for supporting a plurality of individual containers in side by side relationship.

Referring now to FIGS. 1 and 2, the conveyor means 20 is provided with a plurality of support elements 70. The support elements 70 are attached to chains 21, 22 by connecting brackets 71. The support elements 70 are detailed in connected relationship to be juxtapositioned relative to each other and to extend completely around the length of endless chain members 21, 22. The support elements 70 are substantially rectangular in configuration and include a pair of transversely extending side members 72, 73 and a pair of longitudinally extending end members 74, 75. As shown in FIG. 2, the frame members 72–75 define a cavity support area generally represented by the reference numeral 80. The frame elements 72–75 are provided with inwardly directed flanges 76 which form a support for a platen support mechanism 90, as will be described in more detail hereinbelow.

The inner wall of end members 74 are provided with a pair of spaced fixed support pins 77, 78. The inner surface of end wall members 75 are provided with a pair of spring biased detent members 79, only one of which is shown in FIG. 2. The spring biased detent members 79 are supported in substantial alignment with the fixed pins 77, 78. The fixed pin means 77, 78 are adapted to be received within complementary recessed notches 91 provided on the platen support member 90 and the spring biased detent means 79 are adapted to be received within recessed notches 92. One important feature of the present invention is that the platen support 90 can be constructed of a number of shapes whereby the platen will support various sized containers or a number of individual containers in side by side relationship. The platen support member 90 chosen for purpose of illustration is provided with three cavity areas 93, 94 and 95, detailed for supporting three complementary sandwich containers 101, 102 and 103 in side by side relationship for advancement through the heat sealing means. The cavity support areas 93, 94 and 95 are detailed in transverse spacing to provide a suitable support surface around the upper edge thereof to support the peripheral flange members of the containers 101–103.

As shown in FIG. 2, the platen support member 90 is provided with a pair of horizontally spaced transversely extending grooves 96, 97. Grooves 96, 97 are provided for receiving film severing means which is operable for separating the cover film generally represented by the reference numeral 110 along the dotted lines 111, 112, respectively. The platen support means 90 is also provided with two longitudinally extending horizontally spaced grooves 98, 99. Grooves 98, 99 are detailed for receiving severing means for severing the film cover 110 along dotted lines 113, 114, respectively. The film severing means will be described in more detail hereinbelow.

Figure 6:
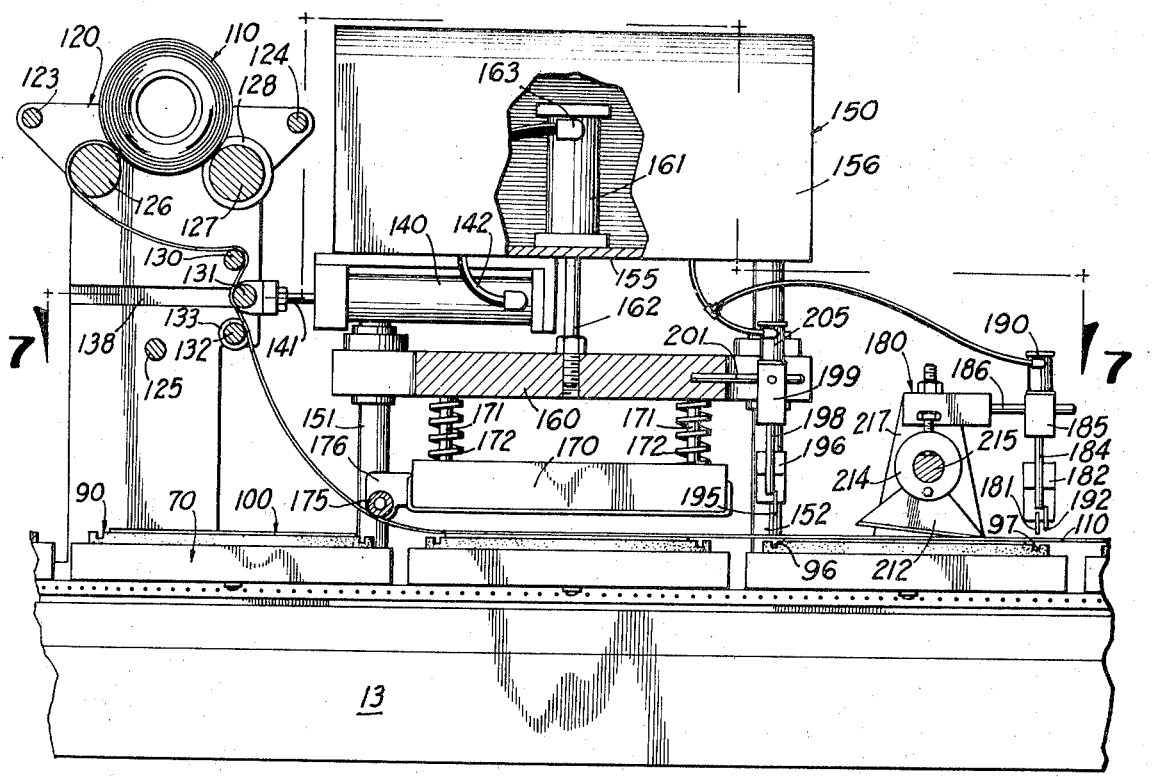
FIG. 6 is an enlarged fragmentary side elevational view of the heat sealing machine shown in FIG. 1 with certain parts broken away and shown in section and certain parts omitted for purpose of clarity.
Figure 7:
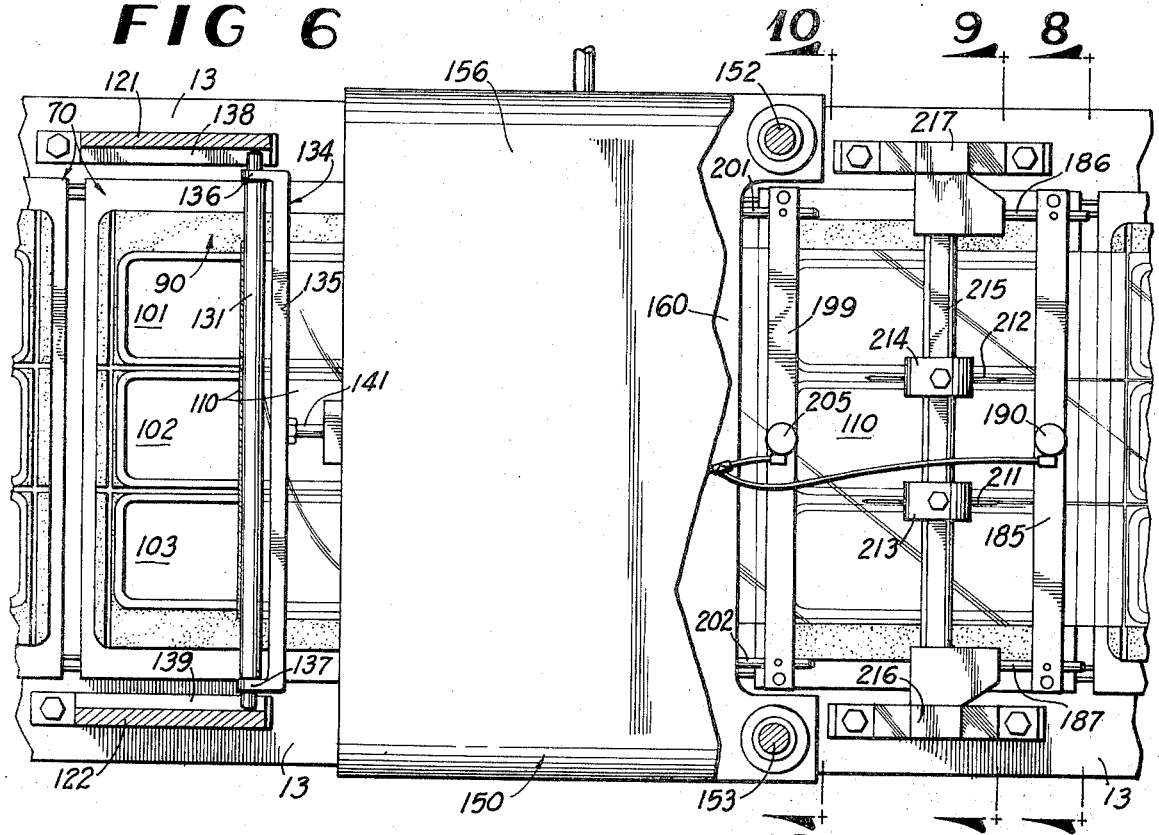
FIG. 7 is a horizontal sectional view taken along line 7—7 of FIG. 6.

Referring now particularly to FIGS. 1, 6 and 7, the heat sealing machine is provided with a film applying means generally represented by the reference numeral 120. The film applying means is supported adjacent an intermediate portion of the upper run of the conveyor means 20. The film applying means includes a pair of vertically oriented parallel arranged frame support members 121, 122. Frame support members 121, 122 are secured in spaced relationship by a number of cross connecting rod members 123, 124 and 125. A pair of support rollers 126, 127 are rotatably supported by frame members 121, 122 in parallel relationship to provide a support for the roll of thermoplastic material 110. The roll of thermoplastic material is maintained in an aligned relationship by a pair of adjustable collar members 128 detailed for contacting the axially extending edges of the roll 110. Only one of the collars 128 is shown in the drawing; however, it is to be understood that a collar member 128 would be located on each of the axial edges of the roll 110, with the collars being adjustable relative to the roller 127 whereby various sized film rolls can be supported. The film roll 110 is supported by the rollers 126, 127 with a free end of the film being fed over a roller 130 in front of a dispensing roller 131 and on a right side of a roller 132 with the free end of the filmstrip being advanced beneath the heat sealing element for application to the upper surface of the containers, as will be described in more detail hereinbelow. The rollers 130, 132 are rotatably supported by the side plate members 121, 122 with roller 132 being provided with adjustable collar means 133 for maintaining the free end of the filmstrip in proper alignment relative to the containers.

As shown in FIG. 6, the film applying means includes a movable dispensing roller 131. The movable dispensing roller 131 is rotatably supported by a U-shaped support member 134. The U-shaped support member 134 includes a base 135 with a pair of parallel arranged outwardly extending leg members 136, 137. The roller 131 includes a pair of axial end portions of reduced diameter which are rotatably supported by legs 136, 137 with extended end portions of the roller being slidably supported within grooves 138, 139 provided on the inner surface of frame members 121, 122, respectively. Reciprocating movement of roller 131 is effected by means of pneumatic cylinder 140. Pneumatic cylinder 140 is supported in a horizontal position beneath a heat sealing control housing and includes a conventional reciprocally operable piston rod 141. The extended end of piston rod 141 is connected to the base portion 135 of the U-shaped rod support member 134. A supply of pneumatic pressure through supply line 142 will cause the piston rod 141 to be extended leftward, as shown in FIG. 6, to thereby effect an unreeling of roll 110 a sufficient amount to permit the free end portion of the filmstrip to cover an adjacent container means. The cyclic operation of the pneumatic cylinder 140 is controlled in the heat sealing operation by cam control means, as will be described in more detail hereinbelow. The cylinder 140 includes a conventional spring return means for moving the roller 131 to the right home position after a dispensing operation.

Referring now particularly to FIGS. 1, 6, 7 and 10, the heat sealing machine includes a heat sealing station generally represented by the reference numeral 150. The heat sealing station 150 is located adjacent the film dispensing means 120, as shown in FIGS. 1 and 6. The heat sealing station includes four vertically extending posts 151, 152, 153 and 154. The posts 151–154 are fixed in parallel arranged vertically extended relationship to the upper surface of two of the longitudinally extending frame elements 13. The four post elements 151–154 are connected adjacent their upper extended end by means of a plate element 155. The upper surface of plate 155 will provide a support for the various control mechanisms for effecting the cyclic operations of the heat sealing means, as will be described in more detail hereinbelow. The plate 155 is provided with a cover housing 156 which will house the cyclic control mechanism.

As shown in FIG. 6, the heat sealing station 150 includes a slidable support block 160. Block 160 is supported for vertical sliding movement on the four posts 151–154 and is controlled in reciprocating movement thereon by a pneumatic cylinder 161. Cylinder 161 is supported above plate 155 and includes a piston rod 162 which extends therethrough and is connected at its extended end to the slidable block 160. Cylinder 161 includes a pressure supply line 163 which is operable for moving the piston rod to an extended position. Piston rod 162 is returned to an upwardly retracted home position by conventional spring means provided within the cylinder. A heat sealing element 170 is supported beneath the slidable block 160. The heat sealing element 170 is connected to the slidable block 160 by four connecting bolts 171. Only two of the connecting bolts 171 have been shown; however, it is to be understood that each side of the heating element will be provided with two horizontally spaced vertically extending connecting bolts 171. The lower extended ends of the connecting bolts 171 are fixed to the heat element 170 with the upper ends of the bolts being slidably supported by block 160. Each of the connecting bolts 171 is provided with a compression spring 172 for biasing the heat sealing element 170 downwardly, as shown in FIG. 6.

In a cyclic heat sealing operation, the heat sealing element 170 is moved downwardly into engagement with the upper surface of the platen 90 and support containers 101-103. The heat sealing element 170 includes conventional electrically operable heater element (not shown) for producing a temperature sufficient to seal the thermoplastic film 110 to the peripheral edges of containers 101-103. In a downwardly extended operable position of the heat sealing element, the springs 172 will cause a yieldable pressure between the heating element 170 and the aligned containers with thermoplastic film.

As shown in FIG. 6, the heat sealing element 170 includes a guide roller 175 supported by parallel arranged bracket elements 176. The bracket elements 176 are fixed to the heat element 170. The guide roller 175 will provide means for guiding the free end of the thermoplastic film 110 into position beneath the heating element 170 and above the upper surface of the containers 101-103.

As shown in FIGS. 6-10, the heat sealing machine includes severing means generally represented by the reference numeral 180 (FIG. 6) for severing the thermoplastic filmstrip 110 at a number of locations to separate the sealed containers from the filmstrip after a heat sealing operation. As shown in FIGS. 6-8, the severing means 180 includes a first severing blade 181. The severing blade 181 is operable for severing the thermoplastic film adjacent the leading edge of the sealed containers, with the blade 181 adapted to be received within the groove portion 97 of the container support platen 90. The severing blade 181 is detailed in transverse length to extend across the filmstrip 110 and is supported by means of a block element 182. Block 182 is supported for vertical reciprocating movement by a pair of vertically extending rod elements 183, 184. The rod elements 183, 184 are connected to a transverse support block 185. The transverse support block 185 is supported for horizontal adjustment on a pair of horizontally extending support rods 186, 187. The adjustment of the support block 185 relative to rods 186, 187 will permit the blade 181 to be adjusted relative to the leading edge of the containers, to thereby accommodate various dimensions of the containers.

The block assembly 182 which supports blade 181 is controlled in a reciprocating severing operation by a pneumatic cylinder 190. The pneumatic cylinder 190 is supported on the upper surface of transverse support block 185 and includes a vertically extending piston rod 191 which is secured to the reciprocating block assembly 182. In a severing operation, the pneumatic cylinder is controlled for effecting movement of the cutting blade 181 from an upwardly retracted position (as shown in FIG. 6) to an extended position wherein the blade 181 is received within the platen groove 97.

In order to maintain the filmstrip 110 in position relative to the platen 90 whereby the blade 181 will properly sever the filmstrip, a pressure bar member 192 is movably supported by the block member 182. The pressure bar 192 includes a serrated lower edge which will contact the filmstrip 110 and hold the filmstrip in position along the upper surface of the platen to prevent the filmstrip from being pressed into the groove 97, allowing the severing blade 181 to effectively sever the filmstrip as it is moved into the groove 97. The pressure bar 192 is spring biased downwardly and is supported for vertical translating movement within the block 182 by conventional slot and spring means (not shown).

Figure 10:
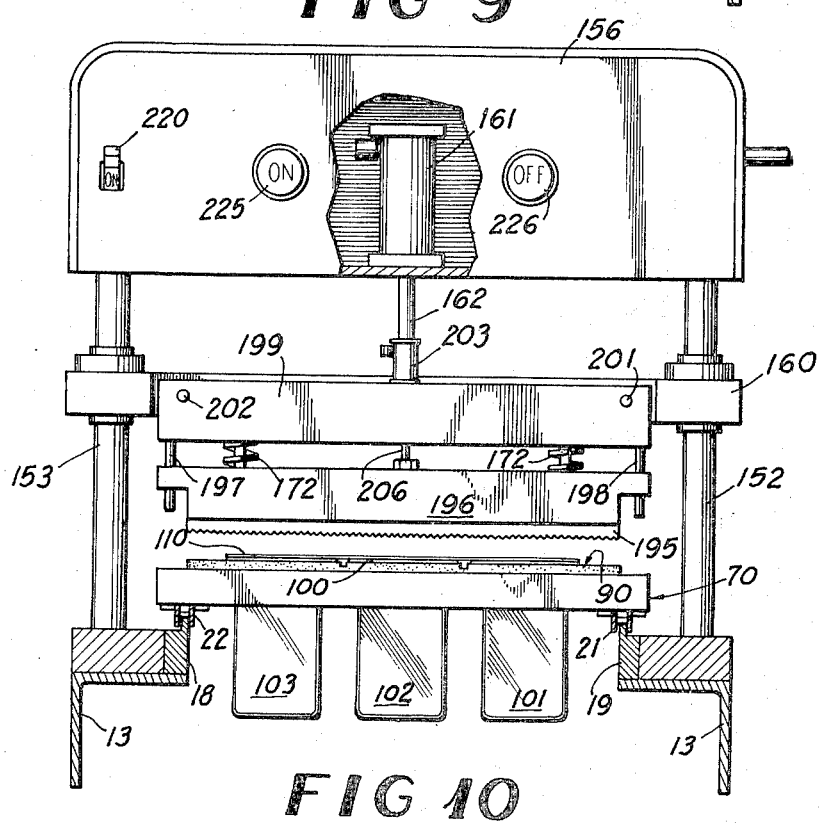

AS shown in FIGS. 6, 7 and 10, the severing means includes a second transversely extending severing blade 195. Severing blade 195 is attached to a transverse horizontally oriented support block 196. Support block 196 is supported for vertical reciprocating movement on a pair of downwardly extending rod elements 197, 198. Rods 197, 198 are attached to a transverse support block 199. Support block 199 is horizontally adjustable on a pair of horizontally extending rods 201, 202. Rods 201, 202 are fixed to the heating station support block 160. Reciprocating movement of block 196 is effected by means of pneumatic cylinder 205. The pneumatic cylinder 205 is supported above the transverse support block 199 and includes a vertically extending piston rod element 206 which has its extended end attached to the movable block 196. Operation of the pneumatic cylinder 205 will effect movement of the support block 196 and blade 195 from an upwardly retracted position (as shown in FIG. 6) to a downwardly extended position wherein the blade 195 will be received within the platen groove 96. Movement of the severing blade 195 into the platen groove 96 will effect a severing of the filmstrip 110 along the dotted lines 111 and adjacent the trailing edge of containers 101-103.

As shown in FIGS. 6, 7, and 9, the severing means 180 includes a pair of horizontally spaced longitudinally arranged severing blades 211, 212. The severing blades 211, 212 are fixed to respective collar elements 213, 214. Collars 213, 214 are supported by a cross support shaft 215. The opposite ends of shaft 215 are supported by a pair of parallel arranged vertically extending frame members 216, 217. Frame members 216, 217 are supported on the upper surface of the frame member 13 and between the severing blades 171, 195. The severing blades 211, 212 are horizontally adjustable relative to each other axially along the support shaft 215 and are adapted to be secured in selectively set positions by conventional set screw means 213a, 214a, respectively. The severing blades 211, 212 can also be adjusted to laterally displaced positions relative to the platen 90 whereby they will be ineffective should a single container be supported by a modified platen support means. Further, additional cutter blades similar to those identified as 211, 212 can be added to the cross support shaft 215 should more than three container elements be supported by a complementary platen support means. One feature of the present invention is the provision of the removable platen whereby various sized containers can be supported for movement through a heat sealing operation and further whereby the severing blades can be adjusted to perform a severing operation on the thermoplastic film along the peripheral edges of whatever type container is used in the heat sealing operation. The severing blades 181, 195 are horizontally adjustable relative to each other to accommodate various longitudinal dimensions of the containers and the severing blades 211, 212 are horizontally adjustable to accommodate various numbers of containers.

Referring now particularly to FIG. 10, the heat sealing machine is controlled in a heat sealing operation by an on and off control switch means 220 which is operable for energizing the motor drive means 40. An additional switch means 225 is provided on the housing 156 for energizing a source of pneumatic supply to operate the pneumatic cylinders 140, 161, 190 and 205. The switch means 225 will also effect operation of the heating element 170. The heating element 170 is electrically operable by conventional electrical control heating elements (not shown). Switch 226 (FIG. 10) is provided for de-energizing the pneumatic supply source and for cutting off the source of power to the heating element 170. The control valves for the pneumatic cylinders 140, 161, 190, and 205 and the switching means for heating element 170 are not shown and are of conventional construction.

Referring now particularly to FIG. 3, the power control shaft 45 is provided with a cam 230. Cam 230 is operatively associated with a control valve 231. Control valve 231 is operatively associated with the pneumatic supply source for effecting movement of each of the cylinders 140, 161, 190 and 205 to an extended operable position, as described hereinabove. The cam control means 230 is detailed in dimension and angularly fixed relative to the position of conveyor crank drive member 47 whereby the cam will effect operation of switch 231 during a 180° angular displacement of crank member 47, as the crank member 47 effects counterclockwise movement of the ratchet assembly 50. During a counterclockwise movement of ratchet assembly 50, the conveyor 20 will be maintained in a static position and will be advanced a predetermined distance forward during a clockwise movement of the ratchet assembly. The ratchet assembly 50 and crank drive means 47 is detailed in driving movement for successively advancing the support elements 70 with a platen and container means to an aligned heat sealing position supported directly beneath the heating element 70.

OPERATION

In utilizing the above described illustrative embodiment of a heat sealing machine embodying the principles of the present invention, a heat sealing operation is performed by connecting the electrical supply means to a conventional electrical supply source and by connecting the pneumatic control cylinder means to a conventional pneumatic supply source. Before a heat sealing operation is started, a roll of thermoplastic film is placed in position on support rollers 126, 127 with the free end thereof threaded around guide roller 130, in front of reciprocating roller 131 and on the right side of guide roller 132. The extended free end of the thermoplastic film 110 is then advanced beneath the guide rollers 175 and under the heating element 170. Prior to initiating a sealing operation, the selected container platen supports 90 are positioned within the plurality of conveyor support elements 70. With the proper platens in position within the support elements 70, a heat sealing operation is begun by moving the control switch 220 to an on position to effect operation of the intermittent cyclic drive of the conveyor 20, and the control switch 225 is moved to an on position to effect operation of the pneumatic supply source and to effect a supply of power of the heating element 170.

With each of the above mentioned switches moved to an on condition, a heat sealing operation is performed by placing he support containers 101-103 within the cavity areas of the support platen and supplying the containers with the the amount of food products to be sealed. The filled containers are then advanced to the right, as shown in FIG. 6, to bring the filled containers into position beneath the heat sealing element 70. As the filled container is moved into an aligned position underneath the sealing element 70, the thermoplastic film is guided into position over the containers by the guide rollers 175 and by forward advancement of the conveyor means. After a filled container has been moved to an aligned position beneath the heating element 170, the cam control element 230 will effect operation of switch control means 231. Operation of switch control means 231 will effect operation of the pneumatic control cylinders 140, 161, 190 and 205. Operation of the control cylinder 161 will move the heating element 170 down into pressing engagement with the thermoplastic film 110 and the upper surface of containers 101-103. Conventional control means is provided within one housing 156 to cause the heating element 170 to heat to a predetermined temperature for sealing the thermoplastic film to the peripheral edges of the containers 101-103. Cylinder 161 will maintain the heating element 170 in a downwardly depressed heat sealing position for a predetermined period of time, or as long as the cam means 230 remains in engagement with the switch control means 231. With the heat sealing element 170 in pressing engagement with the upper surface of the containers and the thermoplastic film 110, the pneumatic cylinder 140 will be operated to extend the guide roller 131 to the left, as shown in FIG. 6, thereby unreeling a predetermined length of filmstrip from the roll 110. The predetermined length of material unreeled from roll 110 is detailed to cover the next platen and container means during a subsequent advancement of the conveyor 20.

After a first sealed container means 101-103 has been sealed and is advanced to the right as shown in FIG. 6, the thermoplastic 110 is severed between the containers 101, 102 and 103 by the severing blade 211, 212 advancing through the groove 98, 99, respectively. After the first sealed containers have moved forward an amount to bring the second containers and support elements into an aligned heat sealing position, a next heat sealing operation of the heating element 170 will effect operation of the control cylinders 190 and 205. Operation of the control cylinders 190, 205 will move the severing blades 181, 195 downwardly to a severing position within the grooves 96, 97 whereby the filmstrip will be severed along the leading and trailing edges of the containers 101-103.

A continued operation of the heat sealing machine is performed by placing successive filled containers within the platen support means 90 prior to advancement of the platens beneath the film applying means and beneath the heat sealing station. The containers which have been sealed and which have had the edges of the thermoplastic material severed, are automatically dropped from the support platen as the support platen moves from the upper run of the conveyor 20 to the lower run of the conveyor. The sealed and severed container means are collected by suitable collection means (not shown). The container means 101-103 shown in FIG. 2 are designed for supporting sandwich portions and can be advanced in a heat sealing operation by placing three of the containers in side by side relationship in a platen element 90 which has been designed to support the three sandwich containers. Should additional container means which are designed for supporting still other food products be needed, the first utilized platens 90 will be removed and replaced by platens which have been designed to support the particular type of container being utilized.

It has now become apparent that the above described illustrative embodiment of a heat sealing machine embodying the principles of the present invention is capable of obtaining the above stated objects and advantages. It is obvious that those skilled in the art may make modification in the details of construction without departing from the spirit of the invention which is to be limited only by the scope of the appended claims.

What is claimed is:

1. A machine for use in sealing containers comprising, in combination:
   a. conveyor means having a plurality of support elements designed for supporting sealable container means;
   b. means on said apparatus for applying a film of thermoplastic material to the upper surface of a container supported by said support elements;
   c. heat sealing means supported adjacent said conveyor means and detailed in cyclic operation for movement between a retracted inoperable position displaced from said support elements and container means and an extended operable position in pressing engagement against said thermoplastic film and the upper surface of said container means, and wherein said heat sealing means is operable in said extended position for sealing said thermoplastic material to the upper surface of the supported container means;
   d. means on said apparatus for severing said plastic film at a transverse direction to said conveying movement and adjacent the leading and trailing edges of said container means;
   e. control means operatively associated with said conveyor means for effecting intermittent drive to advance said support elements through predetermined increments of movement for positioning said support elements in an aligned position beneath said heat sealing means, said control means being operable for effecting cyclic operation of said heat sealing means between said retracted and said extended positions and wherein said control means is operable for effecting cyclic movement of said severing means through a severing operation;
   f. said film applying means comprising means for supporting a roll of film, and means for guiding film from a roll supported on said supporting means to the upper surface of a container supported by said support elements, said guiding means including a pair of rollers mounted on fixed axes, over which said film passes, and a third roller adapted to engage said film intermediate the rollers of said pair;
   g. means for moving said third roller laterally of said film to move the film laterally between the rollers of said pair to form a bight; and
   h. means coordinating the movement of said third roller with that of the heat sealing means so that the film will be moved laterally at the time when said heat sealing means is in pressing engagement with said film, whereby said lateral movement will cause film to be withdrawn from a roll supported on said support means.

2. A machine as defined in claim 1 further characterized in that said conveyor support elements include releasably mounted platen means for holding said container means.

3. A machine as defined in claim 2 further characterized in that spring biased detent means releasably engageable with complementary recessed notches are operatively associated with said support elements and said platen means.

4. A machine as defined in claim 3 further characterized in that said spring biased detent means is supported on said conveyor support elements and said complementary recessed notches are provided on said platen means.

5. A machine as defined in claim 1 further characterized in that said severing means is supported for reciprocating movement above said conveyor from a retracted position displaced from said conveyor to an extended position in cutting engagement with said plastic film sealed to said container means, and wherein said control means is operable for effecting reciprocating movement of said severing means between said retracted and said extended positions.

6. A machine as defined in claim 5 further characterized in that said severing means includes a first severing blade supported in position for severing said plastic film adjacent a leading edge of said container and a second severing blade supported in position for severing the plastic film adjacent a trailing edge of said container.

7. A machine as defined in claim 6 further characterized in that said first and second severing blades are horizontally adjustable relative to each other to accommodate various dimensioned container means.

8. A machine as defined in claim 6 further characterized in that said first severing blade includes a pressure element operable for engaging said plastic film at a position forwardly spaced from the leading edge of said container means for holding said plastic film in position to be severed by said first severing blade.

9. A machine as defined in claim 1 further characterized in that said conveyor support element includes container support platen means designed for supporting a plurality of containers in side by side relationship, and wherein said severing means includes means for severing said plastic film between said side by side containers in response to conveying movement of said support elements.

10. A machine as defined in claim 9 further characterized in that said means for severing said plastic film between said side by side containers includes a number of horizontally spaced severing blades detailed in position for movement between said side by side containers, and wherein said number of horizontally spaced severing blades are adjustable relative to each other to vary the spacing between said severing blades.

11. A machine as defined in claim 1 further characterized in that said control means includes a power driven control shaft having a crank operatively associated with a ratchet means for effecting advancement of said conveyor support elements through said predetermined increments of movement, and wherein said power driven control shaft includes cam control means for effecting cyclic operation of said heat sealing means and said severing means.

12. A machine as defined in claim 11 further characterized in that said conveyor means includes braking means for maintaining said conveyor in a static position during non-driving movement of said ratchet means.

13. A machine as defined in claim 11 further characterized in that said heat sealing means and said severing means are driven through said cyclic operation by pneumatic cylinder means and wherein said cam means is operable for effecting operation of said cylinder means.

14. A machine as in claim 1 wherein the extent of movement of said third roller is such that the amount of film withdrawn from the roll will be sufficient to cover one sealable container means.

15. A machine as in claim 14 wherein the means for moving said third roller comprises a fluid actuated piston.

* * * * *